Nov. 14, 1950 P. D. ZEMANSKY 2,529,529
METHOD AND MEANS FOR LOCATING NEUTRAL
POINT BRUSH SETTINGS
Filed Oct. 10, 1945
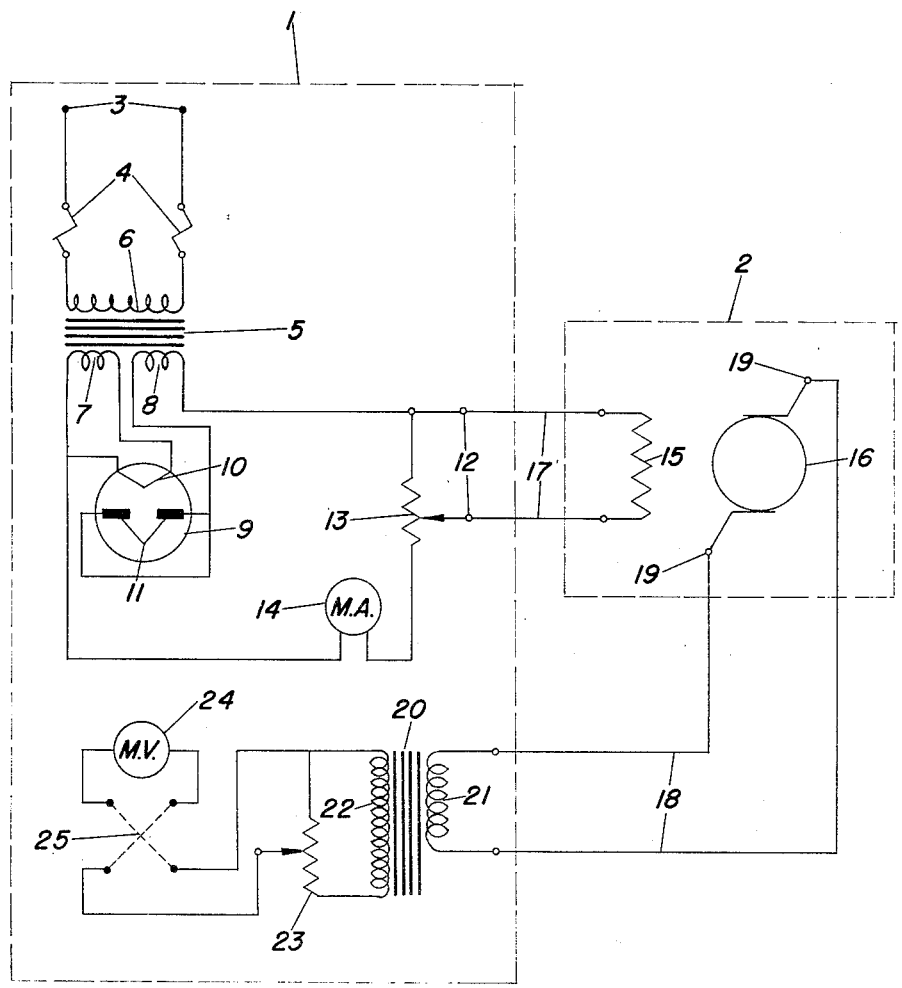
INVENTOR
PHILIP D. ZEMANSKY
BY
Ralph L Chappell
ATTORNEY Patented Nov. 14, 1950

2,529,529

UNITED STATES PATENT OFFICE 2,529,529

METHOD AND MEANS FOR LOCATING NEUTRAL POINT BRUSH SETTINGS

Philip D. Zemansky, San Francisco, Calif.

Application October 10, 1945, Serial No. 621,641

4 Claims. (Cl. 175—183)

(Granted under the act of March 3, 1883, as amended April 30, 1928; 370 O. G. 757)

This invention relates to electrical indicating systems and more particularly to an electrical system for indicating neutral point adjustment of direct current motors and generators.

Previous practice in setting direct current motors and generators on electrical zero or neutral point has involved the connecting of direct current of the rated voltage of the unit under test through an ammeter and single pole switch to the shunt field of such a motor or generator and a zero center scale milli-volt meter across the armature circuit. The armature (rotor) was locked to prevent its rotation. The switch was then opened and closed manually, at as constant a rate of speed as possible. This set an induced current through the armature circuit, causing the milli-volt meter to deflect momentarily on one side of zero when the switch was closed and on the other when the switch was opened. When the brush rigging of the unit under test was properly adjusted, the needle deflection on either side of zero was a minimum, theoretically zero. In such adjustment the brush rigging was known to be at electrical zero or neutral point.

This practice had certain obvious disadvantages. Two highly skilled operators were required. Personal error was introduced in the observing of the moving milli-volt meter indicator. Human error in opening and closing the switch at a uniform speed caused variation of induced voltage. A source of direct current was not always available. The apparatus required was cumbersome and occupied an unnecessary amount of space.

Objects of my present invention are, therefore, to provide an accurate neutral point indicator in no way affecting residual magnetism of the motor or generator; requiring only one operator; capable of giving accurate testing results when operated by relatively unskilled operators; eliminating manual and mechanical errors incident to the conventional manual or mechanical operated switching; to provide a neutral point indicator supplying a wide range of voltages; to provide a small, compact, self-contained neutral point indicator; to provide for accurately, quickly and easily determining the neutral point of a direct current motor or generator.

In accomplishing these and other objects of the present invention, I have provided improved details of structure, the preferred form of which is illustrated in the accompanying drawing, wherein:

The figure is an electrical diagram of a system embodying the features of the present invention.

Referring more in detail to the drawing:

1 indicates generally an embodiment of the present invention. A direct current motor or generator is indicated generally at 2.

Within the embodiment of the present invention as indicated at 1, input terminals 3 are provided to connect the electrical system to an electrical power supply (not shown). Fuses 4 are preferably provided to protect the electrical system from possible damaging electrical surges.

A transformer 5, having a primary coil 6 and a pair of secondary coils 7 and 8, is energized by having its primary coil 6 electrically connected across input terminals 3 by way of the fuses 4. The secondary coils 7 and 8 provide two output voltages from the transformer 5.

A rectifying vacuum tube 9, having a filament 10 and plates 11, is energized by the outputs from the coils 7 and 8 of the transformer 5. The filament 10 is electrically connected to the secondary coil 7. The secondary coil 8 of the transformer 5 supplies the requisite voltage to the plates 11 of the rectifying tube 9. The rectifying tube 9 produces a pulsating direct current.

Output terminals 12 are accessibly located to provide convenient transmission of current from the electrical system of this invention to a motor or generator to be adjusted.

To regulate the electrical output of this electric system, a potentiometer 13 is connected in the output circuit of the rectifying tube 9.

To assist in accurate regulation of the electric output, a milli-ammeter 14 is cooperatively included in the output circuit of the rectifying tube enabling accurate adjustment of the potentiometer 13 by visible reference to the milli-ammeter 14.

The motor or generator 2 includes a shunt field 15 and an armature 16. The pulsating direct current output of the electrical system embodying the present invention is impressed across the shunt field 15 by connecting the output terminals 12 to each end of the shunt field 15. To this end connecting cables or wires 17 are employed.

To measure induced electrical energy in the armature 16, cables or wires 18 are preferably connected to the armature as shown at 19. A transformer 20 is provided to step up the voltage induced in the armature 16. This transformer 20 has a primary coil 21 and a secondary coil 22. The primary coil 21 is energized by armature 16 by means of the cables 18.

To adjust the output voltage of the transformer 20 a potentiometer 23 is employed in the output circuit of the transformer. The output from the transformer 20 after being fed through the potentiometer 23 is impressed across an alternating current milli-volt meter 24. A reversing switch 25 is included in the electrical circuit feeding the milli-volt meter 24 to interrupt the electrical system and to control the flow of electrical current through the milli-volt meter 24.

It is understood that the reversing switch 25 may be dispensed with if an experienced operator predetermines that the voltage applied to the meter 24 will not exceed its maximum rated voltage.

Operation

The operation of an electric system provided as described is as follows:

The armature 16 is locked against rotation. The primary coil 6 of the transformer 5 is energized by connecting an alternating current electrical input supply to the terminals 3.

The electrical output of the transformer 5 as provided by the secondary coil 7 energizes the filament 10 of the rectifying tube 9. The electrical output as provided by coil 8 imparts a charge to the plates 11. So energized, the rectifying tube 9 supplies a pulsating direct current at the output terminals 12.

Visually referring to the milli-ammeter 14, the potentiometer 13 is adjusted to regulate the said output at the terminals 12.

The pulsating direct current is passed through the windings of the shunt field 15 by means of the cables 17 to set up an induced voltage in the armature 16. This voltage is in turn impressed upon the primary coil 21 of the transformer 20 by the cables 18. The transformer 20 steps up the voltage impressed across its primary coil 21.

The electrical current induced in the secondary coil 22 is passed through the potentiometer 23 and the reversing switch 25 to the milli-volt meter 24. The potentiometer 23 is adjusted to safely limit the voltage to which the milli-volt meter 24 is subjected. The reversing switch 25 is closed and the potentiometer is again adjusted to provide a desired magnitude of deflection of the milli-volt meter 24.

A brush rigging, not shown, of the motor or generator 2 under test, is adjustably positioned until the milli-volt meter 24 reads a minimum, ideally zero. The adjustable brush rigging, which forms no part of my invention, may be of any conventional construction such as that shown in "Direct Current Machinery" by Kloeffler, Brenneman & Kerchner published by MacMillan & Co., N. Y., 1934. This is proper neutral adjustment. The brush rigging is secured at this position where the brushes are at the electrical neutral point.

It may thus be seen that, according to my invention, there is passed through the field circuit of the machine a current which varies according to a periodic function, that is, a function which is constituted by repetition of a part of itself. This current is sufficiently small so as not to affect the residual magnetism in the field. This current produces a steady indication on a voltmeter connected in the armature circuit which indication is varied substantially only by the brush setting as long as the field current supply remains the same. This indication is far easier and more accurately read than the "kick" of the voltmeter produced by the prior art method of manually throwing full current through the field.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. The method of locating the neutral brush position in a direct current dynamo-electric machine having adjustable brushes comprising the steps of (1) locking the armature against rotation, (2) passing through the field circuit a direct current varying according to a periodic function and of an order of magnitude insufficient to reverse the residual magnetism in the field, (3) measuring the voltage across the armature caused by the pulsating field and (4) adjusting the position of the brushes until the armature voltage is a minimum.

2. The method of locating the neutral brush position in a direct current dynamo-electric machine comprising the steps of (1) locking the armature against rotation, (2) passing through the field circuit a current varying according to a periodic function and of an order of magnitude insufficient to reverse the residual magnetism in the field, (3) measuring across the brushes the voltage produced in the armature by the varying field current and (4) adjusting the position of the brushes until the armature voltage is a minimum.

3. An apparatus for locating the neutral brush position in a direct current dynamo-electric machine having adjustable brushes comprising means for supplying the field circuit with current varying according to a periodic function and of an order of magnitude insufficient to reverse the residual magnetism in the field and means connected in the armature circuit for measuring the voltage induced in the armature.

4. An apparatus for locating the neutral brush position in a direct current dynamo-electric machine having adjustable brushes comprising means for supplying the field circuit with current varying according to a periodic function and of an order of magnitude insufficient to reverse the residual magnetism in the field and voltmeter means connected in the armature so constructed and arranged as to exhibit a steady indication of the voltage induced in the armature for any particular brush position.

PHILIP D. ZEMANSKY.

REFERENCES CITED

The following references are of record in the file of this patent:

UNITED STATES PATENTS

| Number | Name | Date |
| --- | --- | --- |
| 1,055,911 | Hopkins | Mar. 11, 1913 |
| 1,687,637 | Reynders | Oct. 16, 1928 |
| 2,136,375 | De Forest | Nov. 15, 1938 |

OTHER REFERENCES

Publication, Electric Motor Repair, by Rosenberg, Murray Hill Books, Inc., New York, page 201 in the text section.

Karapetoff, Experimental Eelectrical Engineering, vol. 1, 3rd Ed. 1922, John Wiley & Sons, Inc., New York, pp. 289-292.